May 24, 1966   L. A. FICKEN   3,252,617
DISPENSING APPARATUS HAVING MEANS TO EJECT ARTICLES
ALTERNATELY FROM TWO SOURCES OF SUPPLY
Filed March 27, 1964   9 Sheets-Sheet 1

May 24, 1966 L. A. FICKEN 3,252,617
DISPENSING APPARATUS HAVING MEANS TO EJECT ARTICLES
ALTERNATELY FROM TWO SOURCES OF SUPPLY
Filed March 27, 1964 9 Sheets-Sheet 5

May 24, 1966    L. A. FICKEN    3,252,617
DISPENSING APPARATUS HAVING MEANS TO EJECT ARTICLES
ALTERNATELY FROM TWO SOURCES OF SUPPLY
Filed March 27, 1964    9 Sheets-Sheet 6

Leonard A. Ficken,
Inventor.
Koenig, Senniger, Powers and Leavitt,
Attorneys.

May 24, 1966

L. A. FICKEN 3,252,617

DISPENSING APPARATUS HAVING MEANS TO EJECT ARTICLES
ALTERNATELY FROM TWO SOURCES OF SUPPLY

Filed March 27, 1964

United States Patent Office 3,252,617
Patented May 24, 1966

3,252,617
DISPENSING APPARATUS HAVING MEANS TO EJECT ARTICLES ALTERNATELY FROM TWO SOURCES OF SUPPLY
Leonard A. Ficken, St. Louis, Mo., assignor to Universal Match Corporation, St. Louis, Mo., a corporation of Delaware
Filed Mar. 27, 1964, Ser. No. 355,353
6 Claims. (Cl. 221—116)

This invention relates to vendors, and more particularly to vendors for packs of cigarettes.

The invention involves an improvement on the vendor shown in the copending coassigned application of Robert N. Cox and Leonard A. Ficken, Serial No. 306,924, filed September 5, 1963, issued as U.S. Patent No. 3,193,138, July 6, 1965, entitled, Dispenser With Article Elevator.

The vendor shown in the said copending application comprises a cabinet in which there are first, second and third banks of columns for holding stacks of cigarettes, each bank extending transversely of the cabinet. The columns in each bank are located side-by-side in the respective bank. The second bank of columns is located directly rearward of the first bank, and each column in the second bank is located directly rearward of a respective column in the first bank and paired therewith. Each respective pair of columns in the first and second banks is adapted to be stocked with packs of the same brand (for augmented capacity as to packs of the faster selling brands), and provision is made for alternate vending of packs from the respective pairs of columns in the first and second banks. The third bank of columns is spaced rearward of the second bank, there being an elevator in the space between the second and third bank for raising packs ejected rearward from the columns of the first and second banks and packs ejected forward from the columns of the third bank.

The principal object of this invention is the provision in the above-described type of vendor of an arrangement whereby pairs of side-by-side columns of the third bank of columns may be stocked with packs of the same brand of cigarettes, and whereby packs are vended alternately from the two columns of each such pair in the third bank, for further augumented capacity of the vendor for packs of the faster selling brands, or as an alternative to the arrangement shown in said copending application. Other objects and features will be in part apparent and in part pointed out hereinafter.

The invention accordingly comprises the constructions hereinafter described, the scope of the invention being indicated in the following claims.

In the accompanying drawings, in which one of various possible embodiments of the invention is illustrated.

Corresponding reference characters indicate corresponding parts throughout the several views of the drawings.

Referring to the drawings, there is indicated at 1 the console cabinet of the vendor, having front door 3, delivery pan 11, selector switches S, and first, second and third banks A, B and C of columns, all as shown in said copending application. Exteriorly, the vendor is the same as that shown in said copending application, having twenty-two selector switches (which may be specially referred to as switches S1–S22). The columns in bank A are again generally designated AC, and the eleven columns in this bank are specially designated AC1–AC11 from right to left. Bank A is located at the front of the cabinet. The columns in bank B are again generally designated BC, and the seven columns in this bank are specially designated BC1–BC7 from right to left. The columns in bank C are again generally designated CC, and the eleven columns in this bank are specially designated CC1–CC11 from right to left.

As herein illustrated, provision is made for stocking packs P of cigarettes of one brand in both of columns CC1 and CC2, this pair of columns being designated PC1 (see FIG. 2), and for alternate vending of packs from these columns of this pair. Provision is also made for stocking packs of another brand in both of columns CC3 and CC4, this pair of columns being designated PC2 (see FIG. 2) and for alternate vending of packs from these columns of pair PC2. Provision is further made for stocking packs of still another brand in both of columns CC5 and CC6, this pair of columns being designated PC3 (see FIG. 2) and for alternate vending of packs from these columns of pair PC3. Columns CC7–CC11 are left for single-column vending, as in said copending application.

By reference to said copending application, it will be understood that selector switches S12 and S13 (see also FIG. 17) are associated with columns CC1 and CC2 (pair PC1). By alternate vending of packs from columns CC1 and CC2, it is meant that when a purchaser operates either of switches S12 or S13 to purchase a pack of the brand stocked in columns CC1 and CC2, a pack will be vended from column CC2 if the previous vend was from column CC1 and a pack will be vended from column CC1 if the previous vend was from column CC2. In other words, successive operations of switches S12 and S13 results in vending first from one and then the other of the respective pair PC1 of columns CC1 and CC2. Similar considerations apply as to pair PC2 of columns CC3 and CC4, vending from which is controlled by switches S14 and S15 shown in said copending application and as to pair PC3 of columns CC5 and CC6, vending from which is controlled by switches S16 and S17 shown in said copending application.

Figure 1:
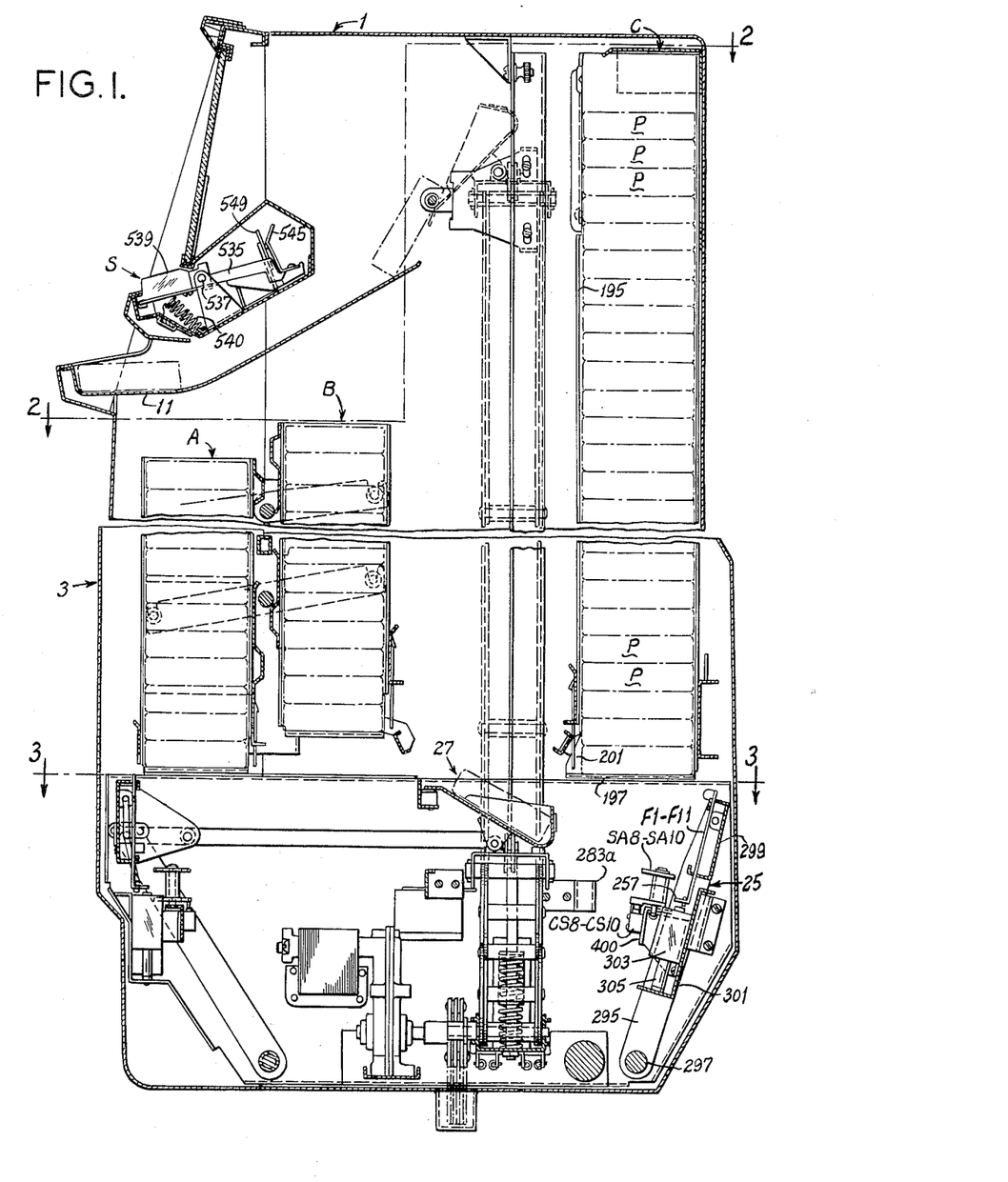
FIG. 1 is a vertical section, corresponding to FIG. 2 of the said copending application, showing the vendor disclosed in that application with parts added thereto in accordance with this invention.
Figure 15:
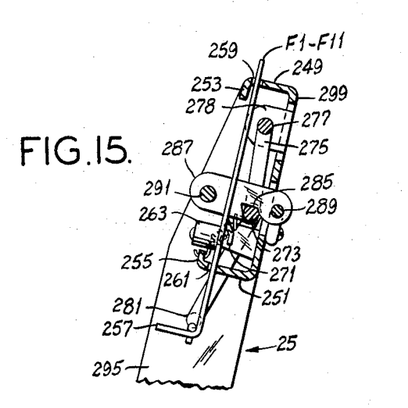
FIG. 15 is an enlarged fragment of FIG. 1.

Means is provided, the same as shown in said copending application, for selectively ejecting forward the lowermost pack from each column of the third bank C. This ejection means is incorporated in a removable assembly 21, and generally comprises a pivoted carrier designated in its entirety by the reference character 25 and a plurality of forward-acting ejectors each generally designated by the reference character F carried by this carrier, one for each of the eleven columns CC1–CC11 of the third bank C. There are eleven ejectors F in all, and these are specially designated F1–F11 from right to left. Each ejector F is carried by the carrier 25 for movement between a lowered retracted position (see FIG. 15) and a raised ejecting position (see FIG. 16). The carrier 25 is swingable forward from a rearward retracted position (see FIGS. 1 and 5) to move forward any ejector F which may be raised to eject the lowermost pack from the respective column of bank C. At 27 is again shown the elevator for receiving a pack ejected from any column and lifting it for delivery over the top of banks A and B to the delivery pan 11. This is fully described in said copending application, and reference may be made thereto for full details.

Bank C comprises an assembly of a series of vertical partitions 185 which define the sides of columns CC1–CC11, and is fixedly mounted on the back wall of the cabinet 1. Each partition has a flange 195 at its forward edge and is formed at its lower edge to provide laterally spaced ledges 197 at the lower ends of the columns for supporting stacks of packs in the columns. Between the ledges 197 at the sides of the lower end of each column in bank C, there is a space 199 to accommodate passage of the respective ejector F when the ejector is raised and moves forward to eject a pack. The front flanges 195 of the partitions terminate short of the ledges 197 so that there is a full width front ejection opening 201 (see FIG. 1) at the bottom of each column in bank C. All this construction is the same as shown in said copending application, and reference may be made thereto for further details.

The pivoted carrier 25 which carries the ejectors F comprises left and right hand arms each designated 295 secured to a horizontal rock shaft 297 which extends across the assembly 21, the ends of the shaft being journalled in side walls 229 and 231 of assembly 21. Arms 295 extend up from this rock shaft and a crossbar 299 extends between the upper ends of these arms. This bar 299 carries the ejectors F1–F11 with each of these mounted for up and down sliding movement relative thereto. Bar 299 is of channel shape in cross section, having forwardly directed upper and lower flanges 249 and 251, with a downwardly directed lip 253 on the upper flange and an upwardly directed lip 255 in the lower flange (see particularly FIGS. 15 and 16). Each ejector is of L-shape, constituted by a sheet metal strip bent to have a forwardly directed lower foot 257, and is slidable in slots 259 and 261 provided in the upper and lower flanges of the channel-section bar 299 adjacent the lips. Each ejector is slidable up and down relative to bar 299 between a lowered retracted position (see FIG. 15) wherein its upper end is below the ledges of the respective column CC, and a raised ejecting position (see FIG. 16) wherein its upper end is adapted, on forward movement of the bar 299 to sweep through the space 199 between the ledges 197 and eject the lowermost pack forward out of the column. The lowered retracted position of each ejector F is determined by engagement of a stud 263 on the ejector with the lip of the lower flange. Extending across the rear of the unit 21, spanning the side walls 229 and 231 thereof, is a fixed bar 301 carrying a series of solenoids 303, one for each ejector F. The plunger of each solenoid is designated 305. This plunger acts up and down, and is normally down when the solenoid is deenergized. When any solenoid is energized, its plunger rises and engages the foot 257 of the respective ejector F to raise the ejector.

Energization of any one of the solenoids 303 may be momentary (by a pulse of current), the solenoid being deenergized immediately following the lift of the respective ejector F and its plunger immediately dropping down. However, when any ejector F is raised to its ejecting position, it is latched in this position by the latching engagement of a struck-out tongue 271 on the ejector with an ejector latch rod 273. This latch rod is located in the space betwen the ejectors and the web of the channel bar 299, extending between the arms 295 and having pivot arms 275 at its ends pivoted as indicated at 277 in ears 278 on the bar 299. Springs 279 bias the latch rod 273 to swing toward the rearward faces of all the ejectors F1–F11. The tongue 271 is formed so that, when any ejector rises, and when the lower end of the tongue clears the latch rod, the latch rod may snap in under the tongue to latch the ejector in its raised ejecting position (see FIG. 16).

Pivot arms 275 have extensions as indicated at 281 which are engageable with latch trips 283a mounted on the inside of side walls 229 and 231 of assembly 21 as carrier 25 reaches the end of its forward ejecting stroke for reverse swinging of the latch rod 273 to release any raised ejector F to allow it to drop down to its lowered retracted position. Thus, when the ejector carrier 25 returns to its retracted (rearward) position, any ejector F which may have been raised on the ejecting stroke of the carrier is down in its lowered retracted position for the return stroke of the carrier.

Figure 6:
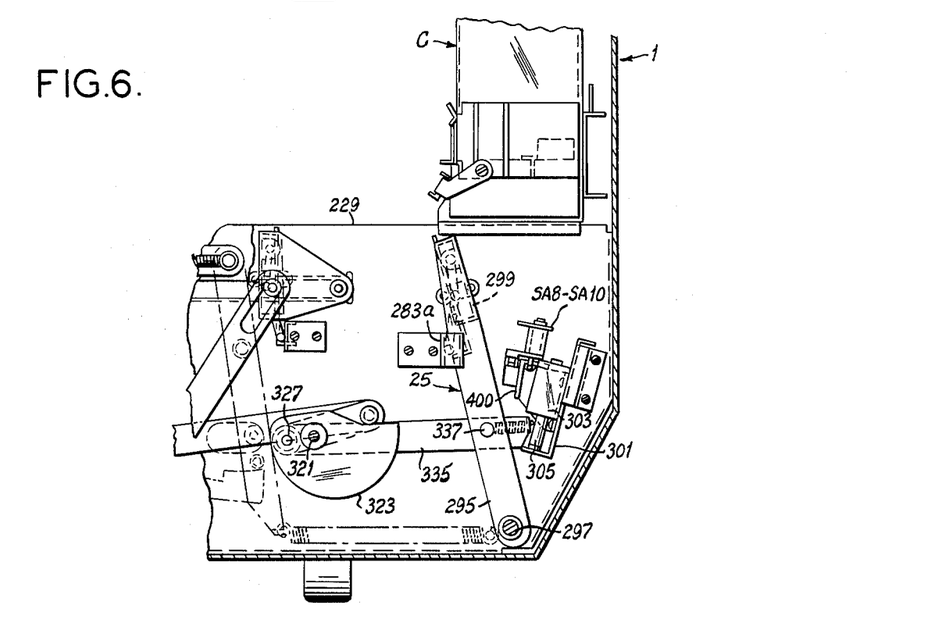

When the carrier 25 is in its retracted (rearward) position, the ejector latch rod 273 is normally locked in a retracted position clear of the tongues 271 on the ejectors F by engagement of the latch rod 273 in notches 285 in a series of rocker arms 287 pivoted as indicated at 289 on bar 299. These rocker arms 287 are interconnected by a trip rod 291 extending between the arms 295 directly forward of the ejectors F1–F11 and above the studs 263 on the ejectors. When any ejector is lifted, its stud 263 engages the trip rod 291 to swing arms 287 upward, thereby releasing the latch rod 273 to swing in toward the ejectors for latching the ejector in raised position (compare FIGS. 15 and 16). When carrier 25 moves forward, and the downward extensions 281 of the latch rod pivot arms 275 engage the latch trips 283a toward the end of the forward stroke of the carrier (see FIG. 6), thereby swinging latch rod 273 to its retracted position, arms 287 automatically swing down for engagement of the latch rod 273 in notches 285 (see FIG. 15) to hold the latch rod 273 in retracted position on the return of the carrier to retracted position.

Figure 2:
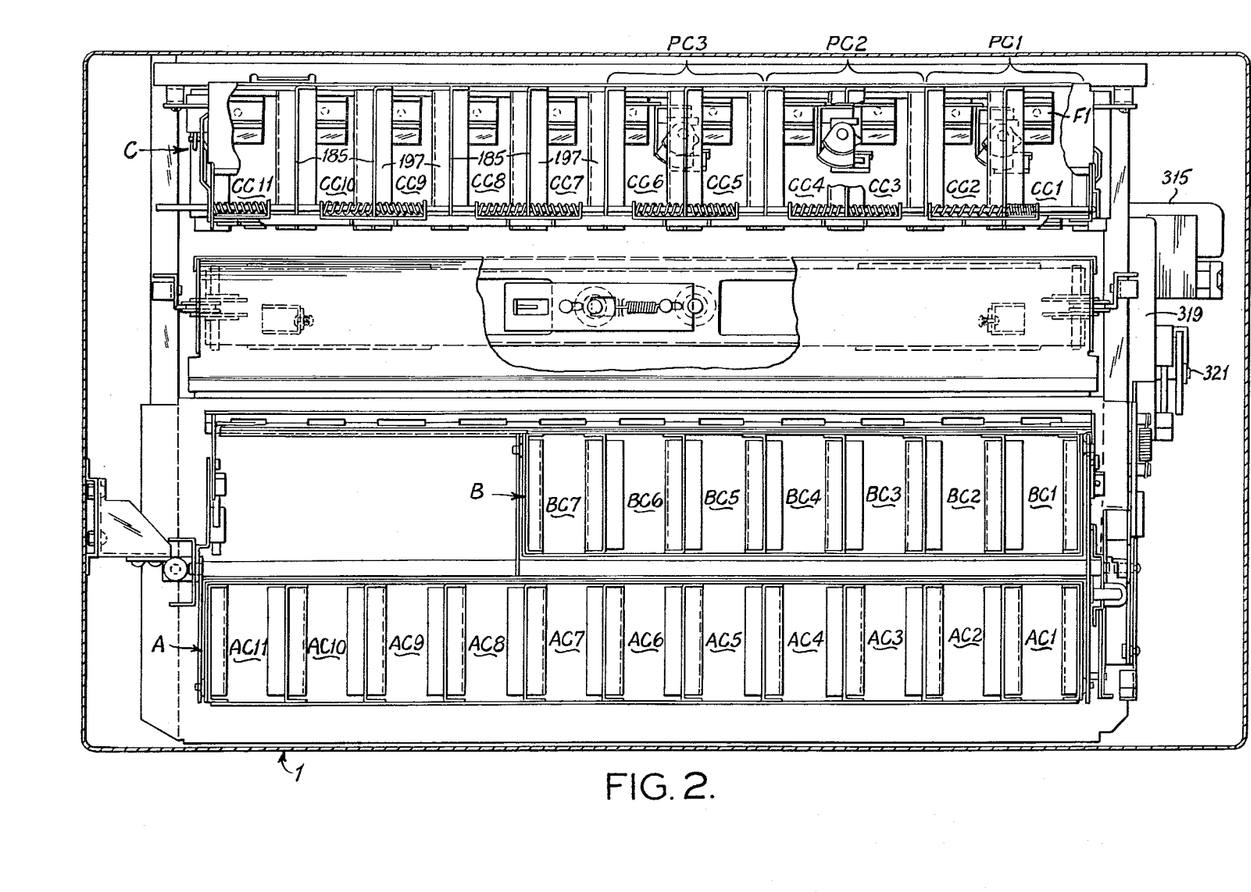
FIG. 2 is a horizontal section taken on line 2—2 of FIG. 1.
Figure 3:
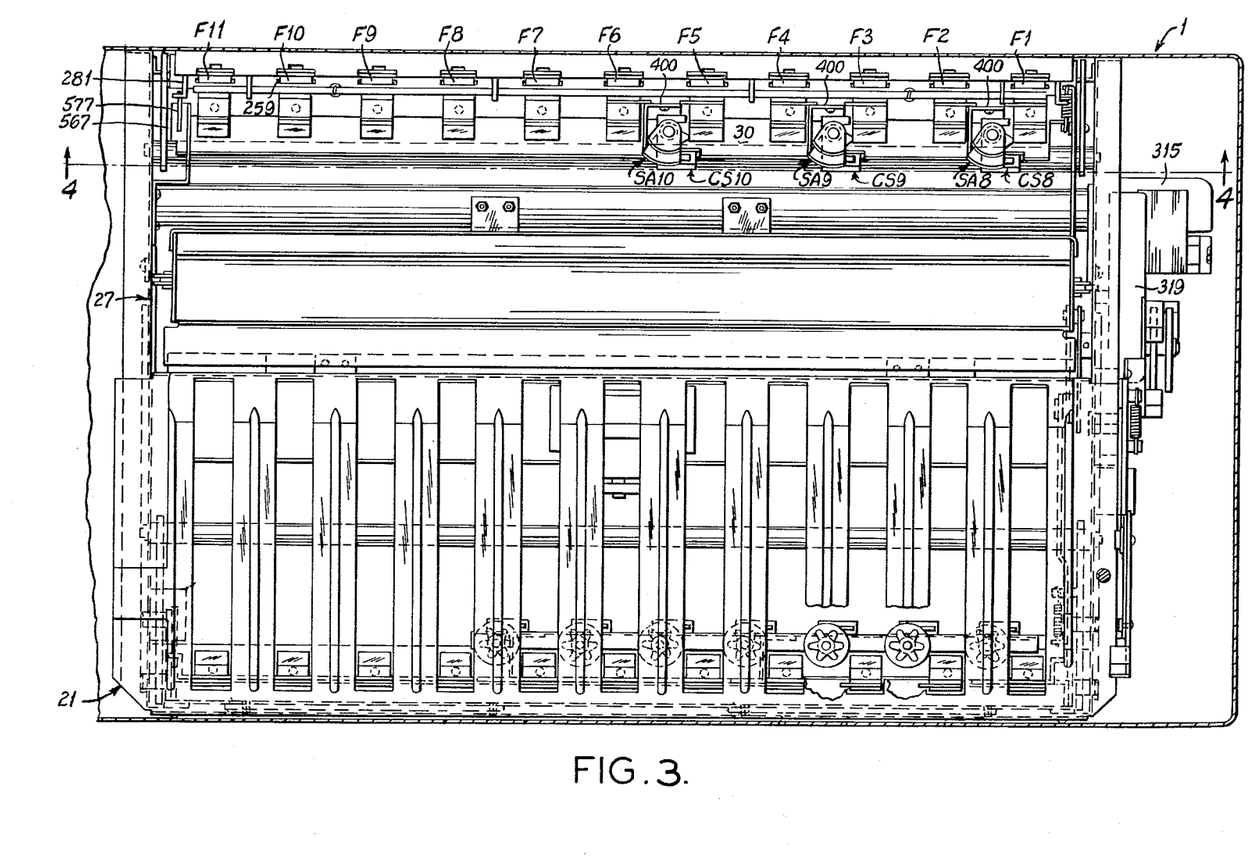
FIG. 3 is a horizontal section taken on line 3—3 of FIG. 1.
Figure 5:
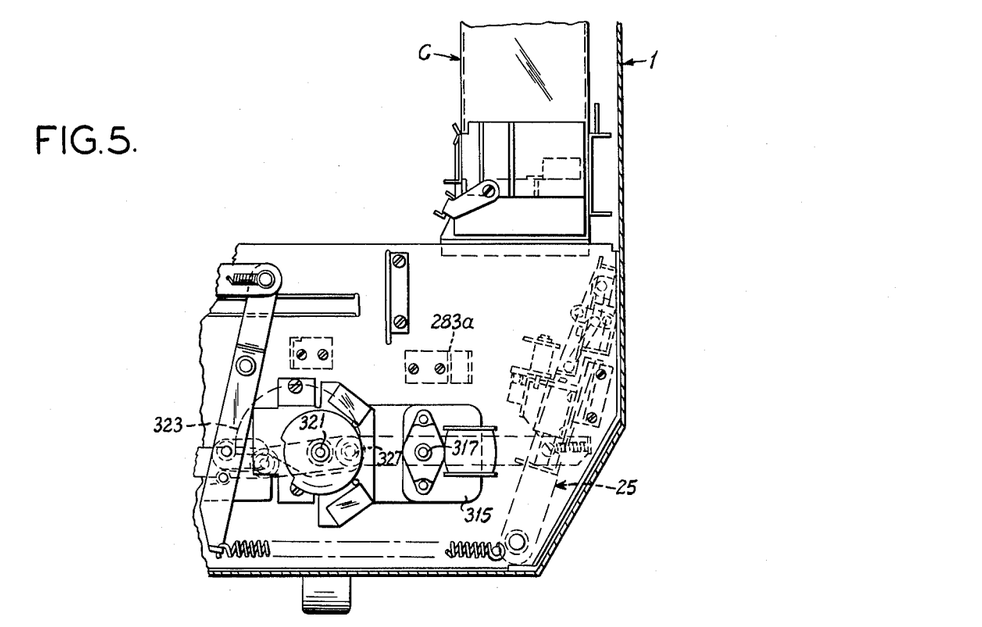
FIGS. 5 and 6 are views corresponding to portions of FIGS. 6 and 7 of the said copending application, showing the vendor disclosed in that application with parts added thereto in accordance with this invention.

Mounted on the outside of the right side wall 231 of unit 21 is an electric motor 315, the shaft 317 of which is coupled to the input of a speed-reducing gear box 319 (see FIGS. 2, 3 and 5). The output shaft 321 of this gear box extends through a hole in wall 231, and has a disk cam 323 secured on its inner end on the inside of wall 231. A link 335 has a pivotal connection at one end at 327 with the cam 323 and has its other end connected as indicated at 337 to the right-hand arm 295 of the pivoted ejector carrier 25. The arrangement is such that when motor 315 is energized, cam 323 is rotated clockwise as viewed in FIGS. 5 and 6. On each vend cycle, the motor is energized to drive the cam through a single revolution. During the first half of the revolution of the cam, link 335 acts to swing the pivoted carrier 25 forward through a forward ejecting stroke (compare FIGS. 5 and 6). Then, on the completion of the revolution of the cam, link 335 swings carrier 25 back rearward through a return stroke.

In accordance with this invention, a switch CS8 (which may be referred to as an alternating switch) and an actuator or alternator SA8 are provided for pair PC1 of columns CC1 and CC2 for effecting alternate vending of packs from this pair of columns on successive operations of either of selector switches S12 and S13. Similarly, an alternating switch CS9 and an alternator SA9 therefor are provided for pair PC2 of columns, and an alternating switch CS10 and an alternator SA10 therefor are provided for pair PC3 of columns. Switch CS8 and alternator SA8 are mounted on a bracket 400 carried by bar 301 between solenoids 303 for ejectors F1 and F2 associated with columns CC1 and CC2. Switch CS9 and alternator SA9 are similarly mounted on an identical bracket 400 carried by bar 301 between solenoids 303 for ejectors F3 and F4 associated with columns CC3 and CC4. Switch CS10 and alternator SA10 are similarly mounted on an identical bracket 400 carried by bar 301 between solenoids 303 for ejectors F5 and F6 associated with columns CC5 and CC6.

Switches CS8, CS9, CS10 are identical, each having a switch arm 402 biased to swing upward and having a roller 404 at its free end engageable with the respective alternator SA8, SA9, SA10. The three alternators are identical, each comprising a sleeve 406 having upper and lower sector-shaped end heads 408 and 410, respectively (see FIGS. 7–14). As shown best in FIGS. 7–10 for alternator SA8, the sleeve is journalled on a stud 412 extending upward from bracket 400 for swinging movement around the axis of the stud between a left-hand position (see FIG. 9) wherein the left edge 408L of head 408 is angled forward toward the left and the right edge 408R of head 408 is in a front-to-rear plane and a right-hand position (see FIG. 10) wherein the left edge 408L of head 408 is in a front-to-rear plane and the right edge 408R of head 408 is angled forward toward the right. The stud 412 extends up from a top flange 414 of bracket 400. This flange has a notch 416. A stud 418 extends down from the lower head 410 into this notch. An overcentering tension spring 420 connected between bracket 400 and stud 418 acts to overcenter the alternator between its stated left-hand and right-hand positions, which are determined by engagement of stud 418 with opposite sides of the notch 416 (compare FIGS. 9 and 10).

Figures 7, 8, 9, 10:
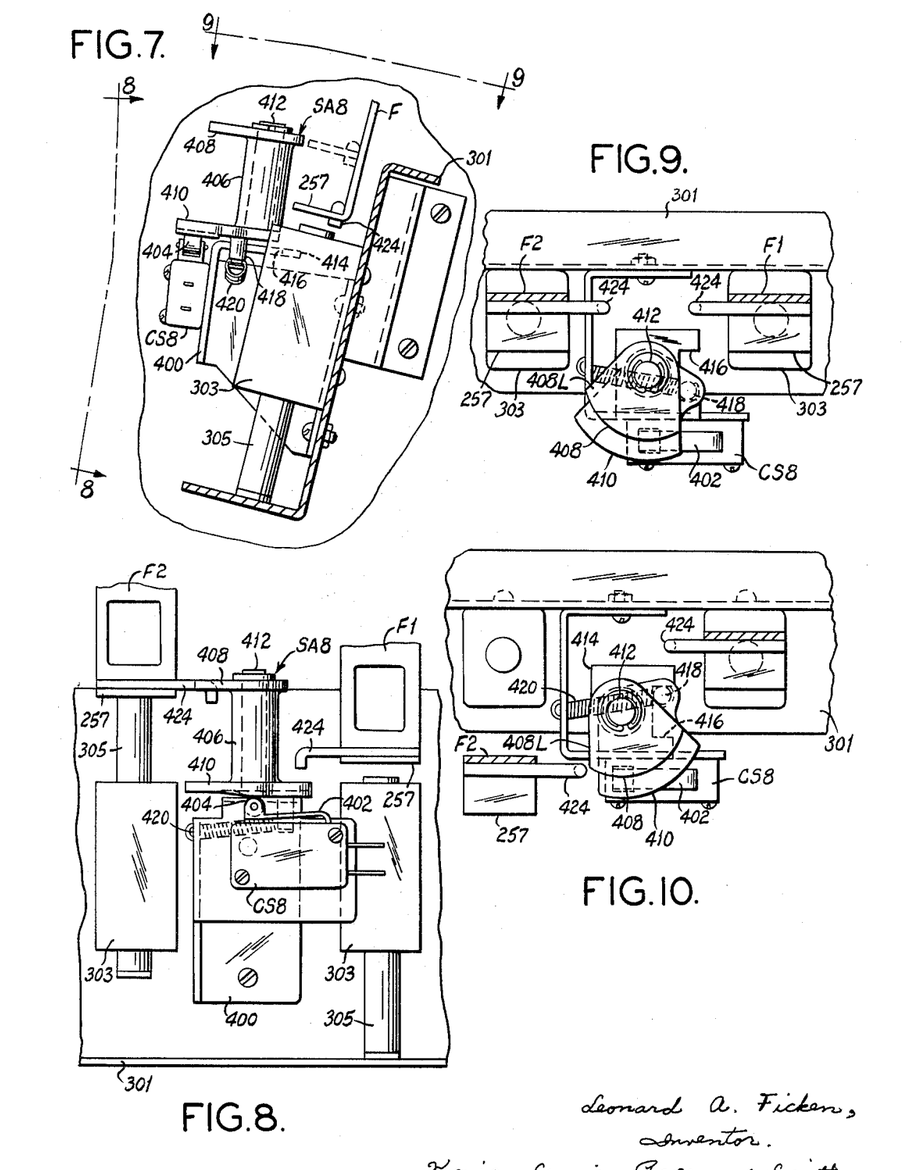
FIG. 7 is an enlarged fragment of FIG. 1.
FIG. 8 is a view taken on line 8—8 of FIG. 7.
FIG. 9 is a view taken on line 9—9 of FIG. 7.
FIG. 10 is a view corresponding to FIG. 9 showing a moved position of parts.
Figure 11:
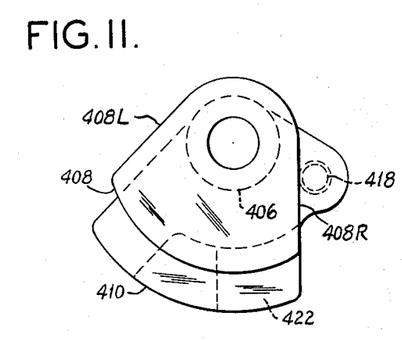
FIG. 11 is a top plan of an actuator or alternator element of the invention.
Figure 12:
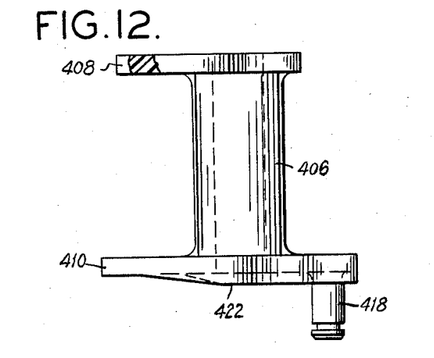
FIG. 12 is a front elevation of FIG. 11.
Figure 13:
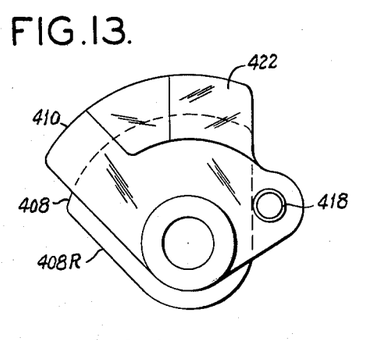
FIG. 13 is a bottom plan of FIG. 12.
Figure 14:
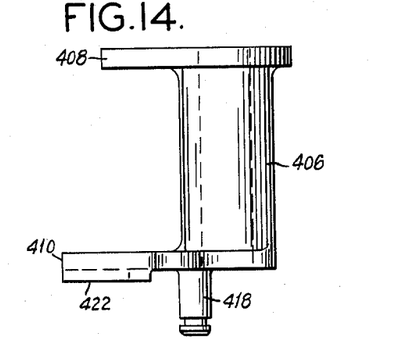
FIG. 14 is a right side elevation of FIG. 11.

The bottom of the lower head 410 is formed to depress switch arm 402 when the alternator is in its left-hand position (see FIGS. 8 and 9) and to allow arm 402 to spring up when the alternator is in its right-hand position (FIG. 10). For this purpose, the bottom of the lower head has a cam rise 422 engageable by roller 404 adapted when the alternator swings to its left-hand position (FIG. 9) to push down the switch arm 402. When the alternator swings to its right-hand position (FIG. 10), arm 402 is allowed to spring up.

Each of the ejectors F1–F6 for the three pairs of columns PC1, PC2 and PC3 carries at the lower end thereof a laterally extending alternator actuator arm 424. As to ejectors F1, F3, F5 (the right-hand ejectors of the respective pairs), arms 424 extend to the left. As to ejectors F2, F4, F6 (the left-hand ejectors of the respective pairs), arms 424 extend to the right. When ejectors F1–F6 are down, arms 424 lie below the upper heads 408 of the alternators SA8, SA9, SA10. When any one of ejectors F1–F6 is raised, arm 424 carried thereby is raised along with it into position for engagement with the respective side edge 408L or 408R (as the case may be) to effect swinging of the respective alternator as the carrier 25 moves forward. Thus, referring to FIGS. 8 and 9, alternator SA8 is shown in its left-hand position. FIG. 9 also shows ejector F2 raised. Arm 424 on ejector F2 is accordingly in raised position for engagement with the left-hand edge 408L of upper head 408 of alternator SA8. On forward movement of carrier 25, carrying the raised ejector F2 along with it, arm 424 on ejector F2 comes into engagement with the left-hand edge 408L of head 408 and effects swinging of the alternator SA8 from its FIG. 9 left-hand position to its FIG. 10 right-hand position, the swing being completed by the over-centering spring 420. Conversely, assuming that the alternator is in its FIG. 10 right-hand position, and that ejector F1 is raised, then on forward movement of carrier 25, arm 424 on ejector F1 comes into engagement with the right-hand edge 408R of head 408, and effects swinging of the alternator back to its FIG. 9 left-hand position.

Figure 17:
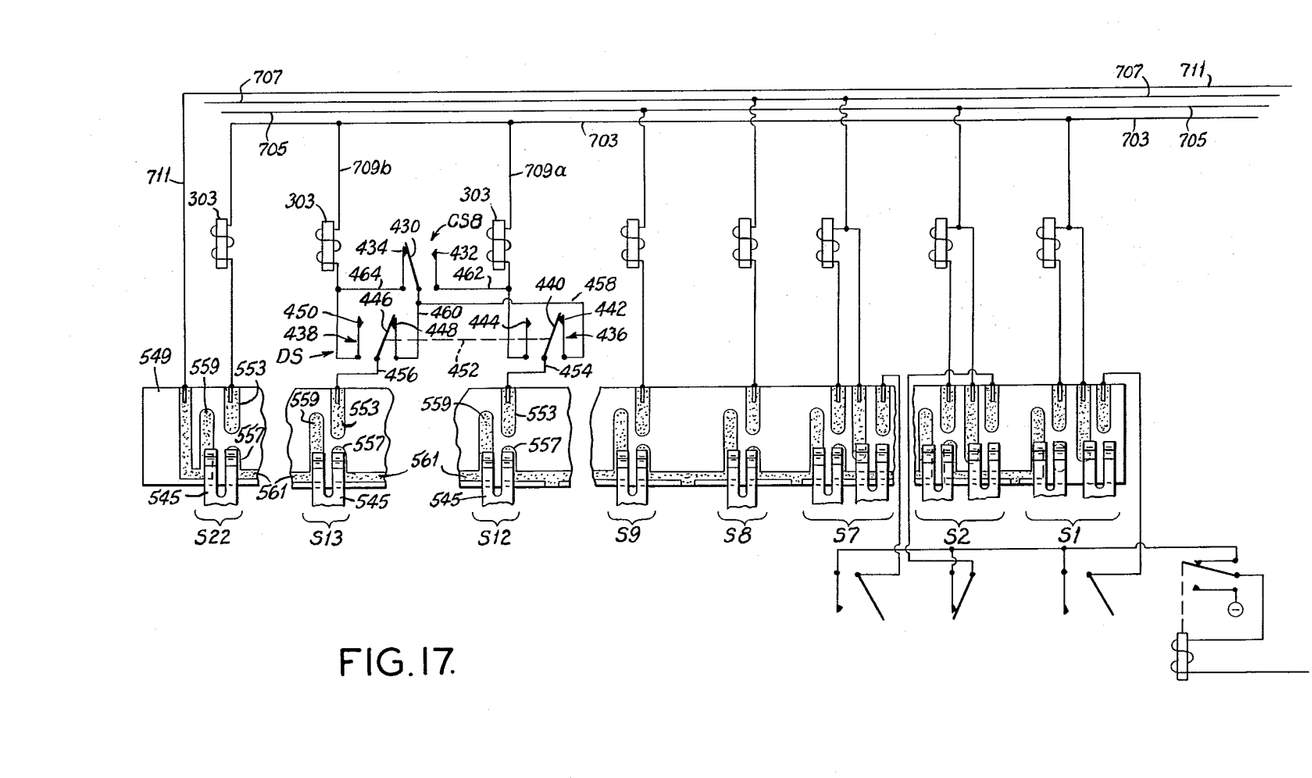
FIG. 17 is a wiring diagram showing a portion of the electrical circuitry of the vendor.
Figure 18:
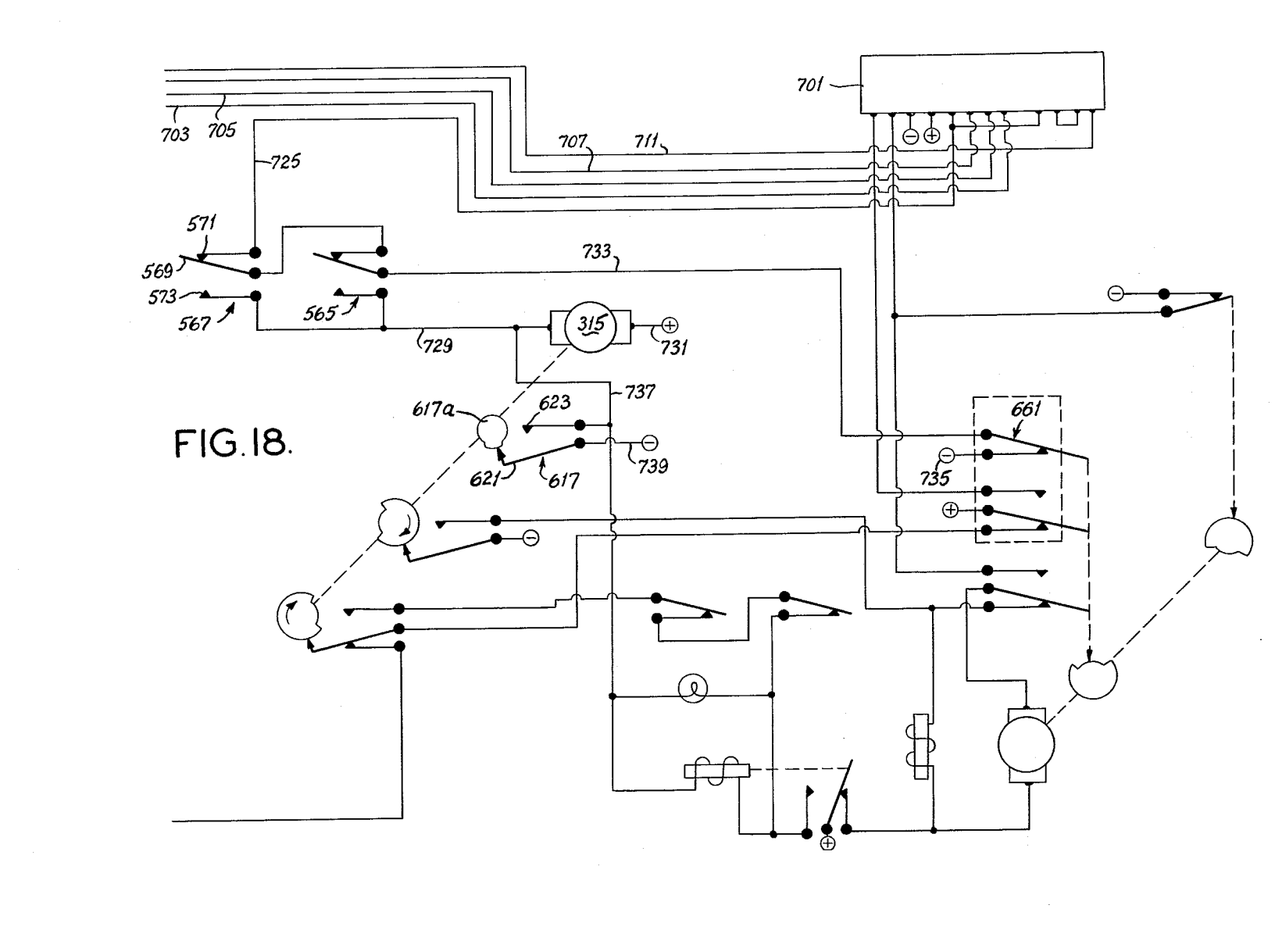
FIG. 18 is a wiring diagram showing the remainder of the circuitry.

FIGS. 17 and 18 show the circuitry of the vendor, which is generally identical to that shown in the aforesaid copending application with the addition of alternating switches CS8, CS9 and CS10, and, for each of these switches, a disabling switch DS (the function of which will appear), and with certain changes in the interconnection of solenoids 303 for ejectors F1–F6 as will appear. While the wiring diagram of FIGS. 17 and 18 includes all the elements of the diagram of FIGS. 23 and 23A of the aforesaid copending application, only those elements thereof essential for an understanding of the operation the vendor for vending from columns CC1–CC6 will be described.

The selector switch for each of columns CC1–CC6 comprises a lever 535 pivoted at 537 (see FIG. 1) having a button 539 on its outer end. Each lever 535 is biased by a spring 540 to swing clockwise as viewed in FIG. 1 to a retracted position wherein its forward end is raised and its rearward end is lowered. The lever carries a forked blade 545 at its rearward end (see FIGS. 1 and 17). Each tine of the blade has a nose engaging a relatively narrow printed circuit board 549 under the inherent bias of the blade. Each blade 545 normally occupies a lowered position, and when the respective button 539 is pushed down, the blade moves up and wipes over the circuit board. With regard to each of selector switches S12–S22, the circuit board is printed with a relatively short contact 553 extending down from its upper edge, a relatively short contact 557 extending upward from near the lower edge of the board and terminating short of contact 553 so that there is a gap therebetween, and a relatively long contact 559 extending upward from near the lower edge of the board alongside contacts 553 and 557. Contacts 559 and 557 of successive switches S12–S22 are interconnected as indicated at 561. Blade 545 of each switch S12–S22, when down, interconnects contacts 559 and 557 and, when up, interconnects contacts 559 and 553.

At 701 in FIG. 18 is indicated the coin-handling apparatus of the vendor, which has means whereby a circuit is completed to a so-called high price line 703 on deposit of coin in the amount of a high price (40¢, for example), whereby a circuit is completed to a so-called medium price line 705 on deposit of coin in the amount of the medium price (35¢, for example), and whereby a circuit is completed to a so-called low price line 707 on deposit of coin in the amount of the low price (30¢, for example). Such apparatus is well known in the art.

To simplify the wiring diagram, only selector switches S1, S2, S7, S8, S9, S12, S13 and S22 are shown. Switches S1, S2, S7, S8, S9 and S22 are shown for the purpose of relating the wiring diagram to that of the aforesaid copending application. FIG. 17 shows alternator switch CS8, which is controlled by alternator SA8 common to columns CC1 and CC2, for effecting alternate vending from these columns. This alternator switch is a double-throw switch having a blade 430 adapted to close alternately on either of two fixed contacts 432 and 434. FIG. 17 also shows disabling switch DS, which comprises two interconnected double-throw switches 436 and 438 associated with selector switches S12 and S13. Switch 436 is illustrated as having a blade 440 adapted to close on either of two fixed contacts 442 and 444, and switch 438 is illustrated as having a blade 446 adapted to close on either of two fixed contacts 448 and 450. Blades 440 and 446 are interconnected as indicated at 452, the arrangement being such that blades 440 and 446 are normally closed on contacts 442 and 448, but may be conjointly thrown to close on contacts 444 and 450.

Solenoids 303 associated with column CC1 (the solenoid shown above selector switch S12 in FIG. 17) is connected in a line 709a between one of the price lines (line 703 as shown) and contact 444 of switch 436. Solenoid 303 associated with column CC2 (the solenoid shown above selector switch S13 in FIG. 17) is connected in a line 709b between the same price line and contact 450 of switch 446. Blade 440 of switch 436 is connected by a line 454 to contact 553 of selector switch S12. Blade 446 of switch 438 is connected by a line 456 to contact 553 of selector switch S13. Blade 430 of alternating switch CS8 is connected by branch lines 458 and 460 to contact 442 of switch 436 and contact 448 of switch 438. Contact 432 of switch CS8 is connected by a line 462 to line 709a and contact 434 of switch CS8 is connected by a line 464 to line 709b.

A return line 711 extends from contact 559 of the last selector switch S22 back to the coin-handling apparatus 701. The arrangement is such that when a purchaser deposits coin in the vendor in appropriate amount, and operates one of the selector switches S12 or S13, one or the other of solenoids 303 associated with these switches is energized depending on the setting of alternator switch CS8 (and depending on disable switch DS being set as shown in FIG. 17). Thus, with blade 430 of switch CS8 on contact 434, and with the disable switch DS set as shown in FIG. 17, and assuming a purchaser deposits coin in the amount of the high price (thereby energizing the high price line 703) and operates selector switch S12, a circuit is completed from line 703 through the line 709b and the solenoid 303 connected in line 709b, line 464, blade 430, line 458, blade 440, and line 454 to contact 553 of selector switch S12, thence through blade 545 of switch S13 (which is down) to contact 559 of switch S13, thence via connection 561 between switches S12 and S13 to contact 557 of switch S13, thence via blade 545 of switch S13 (which is down to contact 559 of which S13, and so on throughout the length of the circuit board to the contact 559 of the last selector switch S22, and thence via line 711 back to the coin-handling apparatus. If the purchaser operates selector switch S13 instead of S12, a circuit is completed from line 703 through line 709b and the solenoid 303 connected in line 709b, line 464, blade 430, line 460, blade 446 and line 456 to contact 553 of selector switch S13, thence through blade 545 of switch S13 (which is raised), etc., to line 711. If blade 430 of switch CS8 is on contact 432 instead of on contact 434, and the purchaser operates selector switch S12, a circuit is completed from line 703 through the line 709a and the solenoid 303 connected in line 709a, line 462, blade 430, line 458, blade 440 and line 454 to contact 553 of switch S12, thence through blade 545 of switch S12 (which is raised), etc., to line 711. If the blade 430 of switch CS8 is on contact 432, and the purchaser operates selector switch S13, a circuit is completed from line 703 through the line 709a and the solenoid 303 connected in line 709a, line 462, blade 430, line 460, blade 446, and line 456 to contact 553 of switch S13, thence through the blade 545 of switch S13 (which is raised), etc., to line 711.

Figure 4:
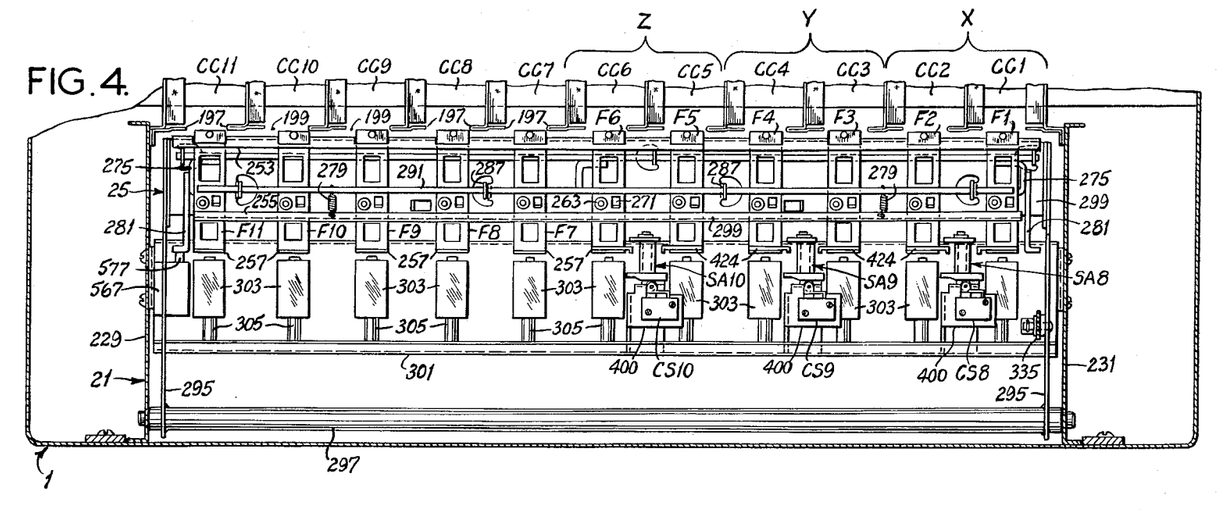
FIG. 4 is a vertical section taken on line 4—4 of FIG. 3.

A circuit for the ejector drive motor 315 is shown to include a line 725 interconnecting the coin-handling apparatus 701 and contact 571 of a switch 567. This switch 567 (see also FIGS. 3 and 4) is controlled by the latch rod 273 for the ejectors F. Switch 567 is a double-throw switch having a blade 569 normally closed on contact 571 and movable off contact 571 on to a fixed contact 573. It has an arm 577 engageable by the pivot arm extension 281 at the left end of the latch rod 273 for ejectors F when this rod swings to latch up an ejector F to throw its blade 569 from its contact 571 to its contact 573. Contact 573 is connected by a line 729 to one terminal of motor 315, and the other terminal of the motor is connected as indicated at 731 to the positive side of the power source. Blade 569 is connected by a line 733 to the negative side of the power source as indicated at 735. This line 733 includes switches 565 and 661 which, for purposes of this description, may be regarded as closed for establishment of the stated circuit for motor 315 whenever blade 569 of switch 567 closes on contact 573.

Once motor 315 starts, it is held in operation for a single revolution of drive shaft 321 by establishment of a holding circuit comprising a line 737 interconnecting line 729 and terminal 623 of a holding switch 617 having a blade 621 connected to the negative side of the power source as indicated at 739. As represented in FIG. 18, switch 617 is controlled by a cam 617a driven by motor 315, with the arrangement such that cam 617a closes switch 617 shortly after the motor starts to establish the holding circuit 737, 739 for the motor, then opens switch 617 at the end of a single revolution of shaft 321.

Operation is as follows:

For purposes of describing the operation of the vendor, it will first be assumed that a purchaser deposits coin in the amount of the high price and actuates selector switch S12 to obtain a pack of cigarettes of the brand stocked in pair PC1 of columns CC1 and CC2. It will also be assumed that, on the previous purchase of a pack of this brand, the pack had been ejected from column CC1, in consequence of which the alternator SA8 is in its left-hand FIG. 9 position and blade 430 of alternator switch CS8 is closed on contact 434 as appears in FIG. 17. On deposit of coin in the amount of the high price, the high price line 703 is energized from the coin-handling apparatus 701. On actuation of switch S12 by the purchaser, its blade 545 moves up to bridge its contacts 559 and 553. This results in energization of the solenoid 303 connected in line 709b, which is the solenoid for raising ejector F2 for column CC2, and ejector F2 is thereby raised.

Figure 16:
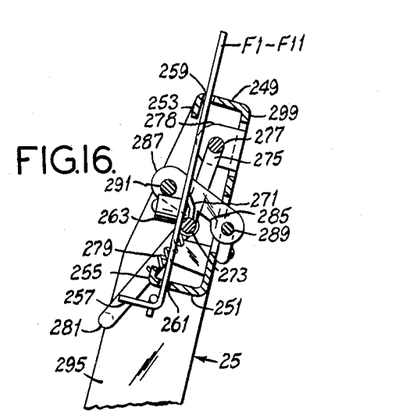
FIG. 16 is a view corresponding to FIG. 15 showing a moved position of parts.

Ejector F2, raised to ejecting position by the respective solenoid 303, becomes latched in raised ejecting position by the ejector latch rod 273 of carrier 25 (see FIG. 16). Latching occurs by reason of forward swing of the pivot arms 275 for the latch rod. The extension 281 of the left-hand pivot arm 275 swings off operating arm 577 of switch 567 which results in blade 569 closing on contact 573. This completes a circuit for ejector motor 315, this circuit being from the positive connection at 731 through the motor, line 729, contact 573 and blade 569 of switch 567 and line 733 to the negative connection at 735.

Motor 315, thus started, drives shaft 321 clockwise as viewed in FIG. 5. Cam 323 rotates with shaft 321. Link 335, connected between the cam and carrier 25, acts to swing the carrier 25 forward. The motor remains energized for a single revolution of cam 323 which acts to swing the carrier 25 forward through an ejecting stroke and then back to its rearward retracted position. The raised ejector F2, moving forward with carrier 25, pushes the lowermost pack P in column CC2 forward through the ejection opening 201 of column CC2. As the carrier nears the end of its forward ejecting stroke, the pivot arm extensions 281 engage trips 283a, to effect release of ejector F2 so that it drops down to its lowered retracted position (see FIG. 15) and becomes locked therein by the notched rocker arms 287. On return of the carrier 25 to its rearward retracted position, the extension 281 of the left-hand pivot arm 275 (now back in its FIG. 15 position) engages operating arm 577 of switch 567 to throw blade 569 back on to contact 571. This breaks the circuit for motor 315, holding circuit 737, 739 being broken by opening of switch 617 by cam 617a.

The purchaser may actuate selector switch S13 instead of S12, and vending will still occur from column CC2. On actuation of switch S13, its blade 545 moves up to bridge its contacts 559 and 553, and this also results in energization of solenoid 303 connected in line 709b, with attendant raising of ejector F2 and vending of a pack from column CC2 as above described.

On vending as above described from column CC2 by operation of either of selector switches S12 or S13, as the raised ejector F2 moves forward, the alternator actuator arm 424 of ejector F2 engages the left-hand edge 408L of the upper head 408 of alternator SA8, and effects swinging of the alternator SA8 to its right-hand FIG. 10 position. This throws blade 430 of alternator switch CS8 on to contact 432 and thereby conditions the vendor for vending a pack from column CC1 the next time either of selector switches S12 or S13 is operated (after deposit of appropriate amount in coin), as will appear.

Now, the previous vend having occurred from column CC2, alternator SA8 having been swung to its right-hand FIG. 10 position, and blade 430 having been thrown on to contact 432, the next vend on operation of either of selector switches S12 or S13 will occur from column CC1. If the purchaser actuates switch S12, its blade moves up to bridge its contacts 559 and 553, and this results in energization of the solenoid 303 connected in line 709a, which is the solenoid for raising ejector F1 for column CC1, and ejector F1 is thereby raised. Motor 315 is put into operation for a vend cycle in the same manner as above described, and carrier 25 swings forward through an ejecting stroke and then back to retracted position. The raised ejector F1, moving forward with carrier 25, pushes the lowermost pack P in column CC1 forward through the ejection opening 201 of column CC1. If the purchaser actuates switch S13, solenoid 303 connected in line 709a is energized to effect dispensing from column CC1 in similar manner.

On vending as above described from column CC1 by operation of either of selector switches S12 or S13, as the raised ejector F1 moves forward, the alternator actuator arm 424 of ejector F1 engages the right-hand edge 408R of the upper head 408 of alternator SA8, and effects swinging of the alternator to its left-hand FIG. 9 position. This throws blade 430 of alternator switch CS8 on to contact 434 and conditions the vendor for vending a pack from column CC2 the next time either of selector switches S12 or S13 is operated.

It will be understood that selector switches S14 and S15 (for columns CC3 and CC4) are interconnected with alternator switch CS9 and a disabling switch and the solenoids 303 for the ejectors F3 and F4, and that selector switches S16 and S17 (for columns CC5 and CC6) are interconnected with alternator switch CS10 and a disabling switch and the solenoids 303 for the ejectors F5 and F6 in the same manner as selector switches S12 and S13 are interconnected with alternator switch CS8, disabling switch DS and solenoids 303 for ejectors F1 and F2, and operation on actuation of selector switches S14–S17 will be readily understood from the above.

In view of the above, it will be seen that the several objects of the invention are achieved and other advantageous results attained.

As various changes could be made in the above constructions without departing from the scope of the invention, it is intended that all matter contained in the above description or shown in the accompanying drawings shall be interpreted as illustrative and not in a limiting sense.

What is claimed is:

1. A vendor comprising a pair of columns located side-by-side, each adapted to hold a stack of items to be vended and each adapted for ejection of the lowermost item of the stack therein, means for ejecting the lowermost item from one or the other of said columns comprising a carrier and a pair of ejectors carried by the carrier, one for each column, each ejector being carried by the carrier for movement between a retracted position and an ejecting position, said carrier being movable to move one or the other of the ejectors in ejecting position to eject the lowermost item from the respective column, actuating means including control means operable by a purchaser for effecting movement of one or the other of said ejectors to ejecting position and movement of the carrier, and means responsive to movement of the carrier with one of said ejectors raised for conditioning said actuating means to effect movement of the other ejector to ejecting position on the next operation of the control means by a purchaser, said conditioning means comprising an alternator common to the two ejectors movable between first and second positions, one ejector when in ejecting position and moved with the carrier being engageable with the alternator to move it from first to second position, the other ejector when in ejecting position and moved with the carrier being engageable with the alternator to move it from second to first position.

2. A vendor comprising first and second columns located side-by-side, each adapted to hold a stack of items to be vended and each adapted for ejection of the lowermost item of the stack therein, said columns being adapted to be stocked with identical items or with different items, means for ejecting the lowermost item from one or the other of said columns comprising a carrier and first and second ejectors, one for each column, carried by the carrier, each ejector being carried by the carrier for movement between a retracted position and an ejecting position, said carrier being movable to move one or the other of the ejectors in ejecting position to eject the lowermost item from the respective column, first and second purchaser-operable selectors, one for each column, means operable by said selectors for effecting movement of one or the other of said ejectors to ejecting position and movement of the carrier to eject an item from one or the other of said columns, means responsive to ejection of an item from one column by the respective ejector for conditioning said selector-operable means to effect ejection of an item from the other column by the other ejector on the next operation of either selector by a purchaser when said columns are stocked with identical items, and means for disabling said ejection-responsive means for effecting ejection of an item from the first column by the first ejector only on operation of the first selector and ejection of an item from the second column by the second ejector only on operation of the second selector when the columns are stocked with different items, and said conditioning means comprises an alternator common to the two ejectors movable between first and second positions, the first ejector when in ejecting position and moved with the carrier being engageable with the alternator to move it from first to second position, the second ejector when in ejecting position and moved with the carrier being engageable with the alternator to move it from second to first position 3. A vendor comprising a pair of columns located side-by-side, each adapted to hold a stack of items to be vended and each adapted for ejection of the lowermost item of the stack therein, an ejector carrier movable below said columns away from a retracted position through an ejecting stroke and back to retracted position through a return stroke, means including an electric motor for driving the carrier through an ejecting and return stroke, first and second ejectors carried by the carrier for the first and second columns, respectively, each movable relative to the carrier between a lowered retracted position and a raised ejecting position, a first solenoid for raising the first ejector, a second solenoid for raising the second ejector, purchaser-operable switch means, an electrical interconnection between said switch means, and said solenoids including an alternating switch adapted in a first position for energization of the first solenoid and in a second position for energization of the second solenoid on operation of said switch means by a purchaser, means operable on raising of either ejector for energizing said motor to drive the carrier through an ejecting stroke and a return stroke, and means responsive to ejection of an item from one column by the respective ejector for throwing said alternator switch from one of its said positions to the other to effect ejection of an item from the other column by the other ejector on the next operation of the switch means by a purchaser and said ejection-responsive means comprises an actuator for said alternating switch movable from a first position to a second position by one ejector when raised and moved through an ejecting stroke by the carrier and movable from its second position to its first position by the other ejector when raised and moved through an ejecting stroke by the carrier.

4. A vendor as set forth in claim 3 wherein said actuator is swingable between its said first and second positions and an overcentering spring is provided for overcentering it between said positions.

5. A vendor as set forth in claim 3 wherein said purchaser-operable switch means comprises first and second selector switches for the first and second columns respectively, and wherein switch means is provided for disabling said alternating switch, operation of either selector switch effecting ejection alternately from the columns when the disabling switch means is set set in a first position, operation of the selector switches effecting ejection only from the respective columns when the disabling switch means is set in a second position.

6. A vendor comprising a plurality of columns, each column being adapted to hold a stack of items to be vended and each adapted for ejection of the lowermost item of the stack therein, a plurality of ejectors, one for each column, each operable independently of the others for ejecting the lowermost item of the respective column, means for actuating said ejectors including control means operable by a purchaser for ejecting an item from one or another of said columns, two of said columns being arranged in a pair for sequential vending of items from the columns within said pair independently of vending of items from the other columns, and means responsive only to ejection of an item from one column of said pair of columns for conditioning said actuating means to effect ejection of an item from the other column of said pair on the next operation of the control means for either column of said pair, said conditioning means being independent of ejection of an item from any other column, the two columns of said pair of columns being located side-by-side, and said conditioning means comprising an alternator common to the ejectors for the columns of said pair and operable by either of the ejectors for said pair on operation of the ejectors to eject an item from the respective column.

References Cited by the Examiner
UNITED STATES PATENTS

| | | | |
|---|---|---|---|
| 2,693,299 | 11/1954 | Gross | 221—125 |
| 3,040,928 | 6/1962 | Levine | 221—116 |

RAPHAEL M. LUPO, *Primary Examiner.*

WALTER SOBIN, *Examiner.*